United States Patent [19]

Brosig et al.

[11] Patent Number: 5,106,441
[45] Date of Patent: Apr. 21, 1992

[54] METHOD AND JIG FOR LCD-PRODUCTION

[75] Inventors: Stefan Brosig, Stuttgart; Helmut Thaler, Dettingen, both of Fed. Rep. of Germany

[73] Assignee: Nokia Unterhaltungselektronik, Pforzheim, Fed. Rep. of Germany

[21] Appl. No.: 469,969

[22] Filed: Jan. 25, 1990

[30] Foreign Application Priority Data

Jan. 26, 1989 [DE] Fed. Rep. of Germany ....... 3902255

[51] Int. Cl.⁵ .................. B32B 31/20; B32B 31/28
[52] U.S. Cl. .................. 156/104; 156/273.7; 156/275.3; 156/275.7; 156/285; 156/292; 156/382; 428/1; 359/36
[58] Field of Search ............... 156/99, 104, 285, 292, 156/382, 583.4, 273.7, 275.3, 275.7, 275.5; 350/330, 343; 428/1; 359/36

[56] References Cited

U.S. PATENT DOCUMENTS

| | | | |
|---|---|---|---|
| 1,959,221 | 5/1934 | Sherts ............................ | 156/104 |
| 3,386,503 | 6/1968 | Corning et al. ............... | 156/583.4 X |
| 3,852,136 | 12/1974 | Plumat et al. ................ | 156/104 X |
| 4,362,587 | 12/1982 | Baudin et al. ................. | 156/104 X |
| 4,643,532 | 2/1987 | Kleiman ......................... | 350/343 |
| 4,647,327 | 3/1987 | Rase ............................... | 156/104 X |
| 4,723,484 | 2/1988 | Held ............................... | 156/583.4 X |
| 4,923,552 | 5/1990 | Fukushima et al. ........... | 156/285 |

FOREIGN PATENT DOCUMENTS 59-57221  4/1984  Japan ................................. 350/343

Primary Examiner—Michael W. Ball
Assistant Examiner—Michele K. Yoder
Attorney, Agent, or Firm—Ware, Fressola, Van Der Sluys & Adolphson

[57] ABSTRACT

In a process to manufacture a liquid crystal cell, one of the two plates is provided with an adhesive edge strip. A quantity of liquid crystal which is required to form the liquid crystal layer is applied to one of the two plates and the two plates are brought together and positioned in the vacuum and bonded tightly together by the adhesive curing.

By the fact that the plates with the correct quantity of liquid crystal on one of the plates are joined together in the vacuum, it is no longer necessary to evacuate the inner space between the plates in a time-comsuming process and apply liquid crystal through a small filling hole in another time-consuming process.

10 Claims, 3 Drawing Sheets

METHOD AND JIG FOR LCD-PRODUCTION

BACKGROUND OF THE INVENTION

The invention refers to a process and a device for joining together the two plates of a liquid crystal cell, for bonding them together and for inserting a liquid crystal layer between the two plates.

DESCRIPTION OF THE PRIOR ART

During the manufacture of a liquid crystal cell, the front plate and the rear plate are first provided with function layers, i.e. each with a structured electrode layer and an orientation layer. An insulation layer is also applied on occasions. Two different subprocesses are known for the remaining parts of the process.

In the first subprocess, one of the two plates is provided with an adhesive edge strip which is then kept horizontal so that the adhesive edge strip faces upwards. Liquid crystal is then applied in an excess quantity so that it overflows over the edges of the plate as soon as the other plate is pressed onto the first plate. The adhesive is then cured, either by UV radiation or by tempering at a temperature at which the liquid crystal does not decompose.

In the second subprocess, one of the two plates is also provided with an adhesive edge strip. Spreaders, so-called spacers, are also applied to one of the two plates when the plate is in a horizontal position.

The second plate is pressed down from above onto the first plate provided with spacers and the adhesive is then cured in a tempering process. It must be noted that the adhesive edge strip is not fully closed with the result that the internal space between the plates and the adhesive edge strip is connected to the external space via a small hole. The arrangement thus produced is evacuated in a vacuum vessel and a vessel containing liquid crystal is placed at the opening in the adhesive edge strip and then ventilated. As a result, liquid crystal is forced into the evacuated internal space. Finally, the filling hole is closed with adhesive.

The first subprocess has the disadvantage that the adhesive edge strip is flooded with liquid crystal which is very deleterious to its adhesive qualities, thereby adversely affecting the stability of the cell. This process is therefore only used to manufacture small cells, but on a large scale.

The second subprocess is used exclusively for larger cells. In this process, very stable adhesive seams can be obtained, but the evacuation of the internal space and its subsequent filling with liquid crystal requires a long time, up to a few hours.

The invention is based on the task of specifying a process for manufacturing a liquid crystal cell which can be performed quickly, but which obtains a stable cell. The invention is also based on the task of specifying a device for implementing such a process.

SUMMARY OF THE INVENTION

The invention provides a process for manufacturing a liquid crystal cell consisting of an upper and a lower plate provided with function layers and connected to one another via an adhesive edge strip, and including a liquid crystal layer. In the process, one of the two plates is provided with adhesive edge strips, the two plates are brought together and positioned in a vacuum and joined by means of the adhesive edge strips, and the adhesive is cured. The process is carried out by a device comprising a vacuum unit and a device disposed within the vacuum unit for joining the upper plate and the lower plate, so that the cell is formed in the vacuum unit.

The process according to the invention is distinguished by the fact that the two plates to be joined together are brought together and positioned in the vacuum and bonded by means of the adhesive edge strip which was previously applied to one of the two plates. The adhesive is then cured. A filling hole can be created in the adhesive edge strip. Filling is then performed in the conventional manner by ventilation after placing a vessel containing liquid crystal at the filling hole. During this operation the evacuation time is eliminated. The filling process, however, takes the same amount of time as the conventional process.

The process proves to be considerably more advantageous if liquid crystal is already applied to the lower plate before the two plates are brought together, but only in such quantities that are required to form the desired liquid crystal layer. An adhesive edge strip encompassing the entire perimeter without filling is used. During this operation the processes for evacuating the internal space and for filling with liquid crystal are reduced from, for example, two hours to only two minutes.

Hence, in order to prevent the applied liquid crystal from wetting the adhesive edge strip, it is beneficial to proceed in such manner as the lower plate is at least cooled along its edges to such an extent that the liquid crystal in these zones becomes highly viscous or even solidifies.

The device according to the invention is characterized by the fact that it features a vacuum device and a joining device for bringing the upper and lower plates together. In order to obtain the simplest possible design of the joining device operating within the vacuum, it is beneficial if the latter is provided with a mechanically operating positioning device. Moreover, the process operations to be performed inside the vacuum can be simplified if an UV exposure device is provided to irradiate a UV-curable adhesive. In order to cool at least the edges of the lower plate in addition to the cooling mentioned above, the device should preferably be provided with a cooling device.

DESCRIPTION OF THE PREFERRED EMBODIMENT

Figure 1:
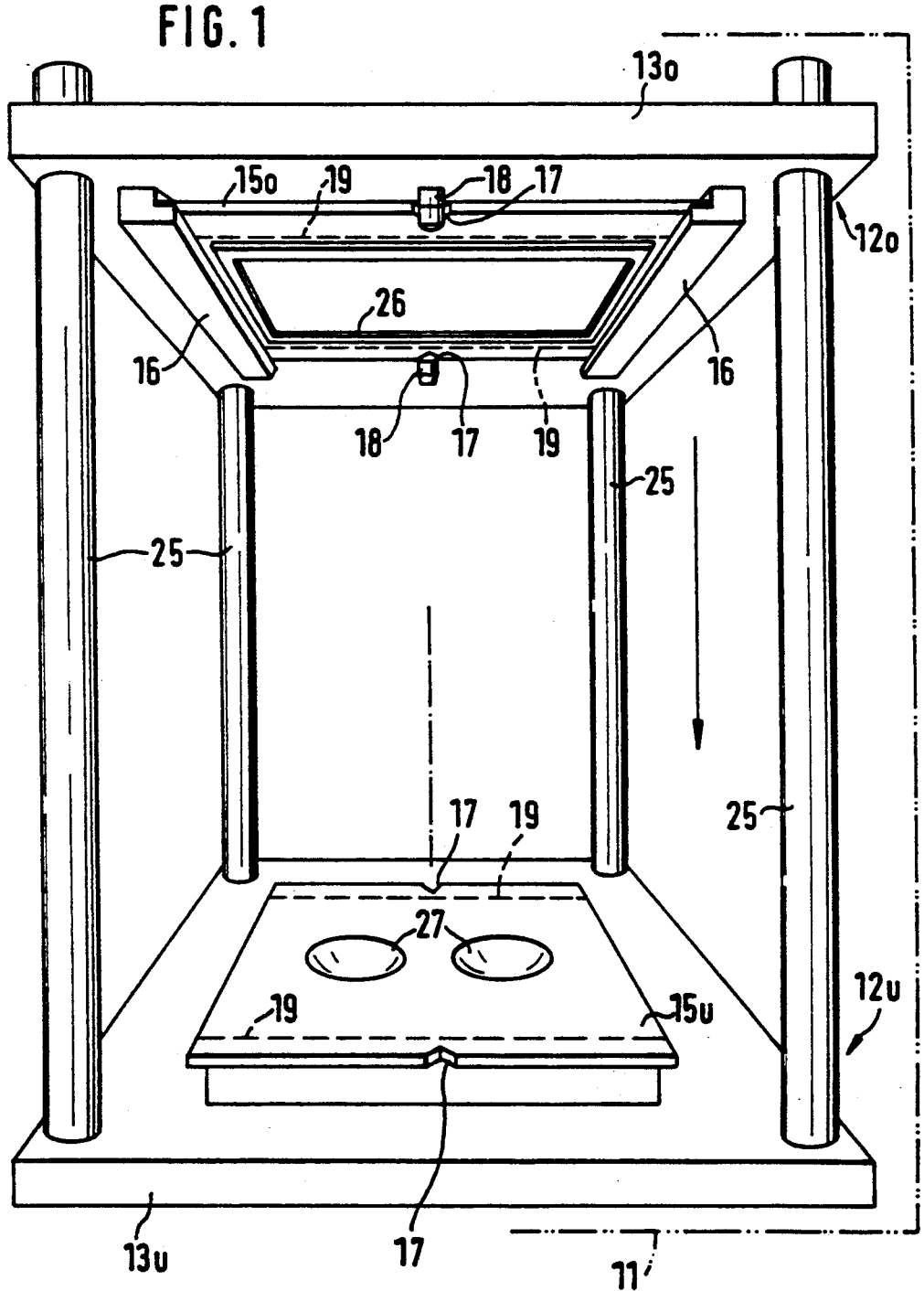
FIG. 1: schematic perspective view into the space between the upper and lower plates which are held by devices and which are to be brought together.
Figure 2:
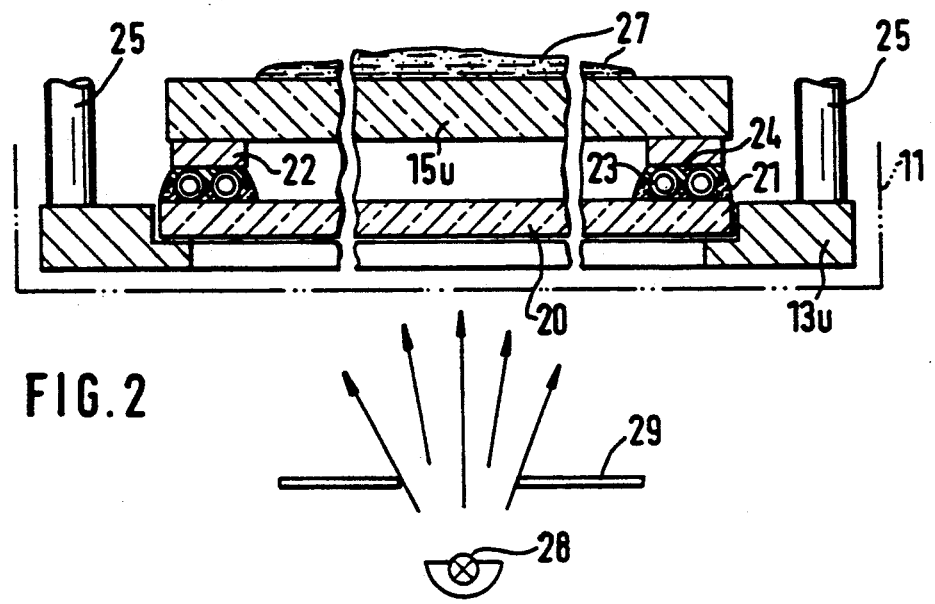
FIG. 2: schematic cross-section through the lower part of a vacuum vessel in which the lower plate of a liquid crystal cell is situated.
Figure 3:
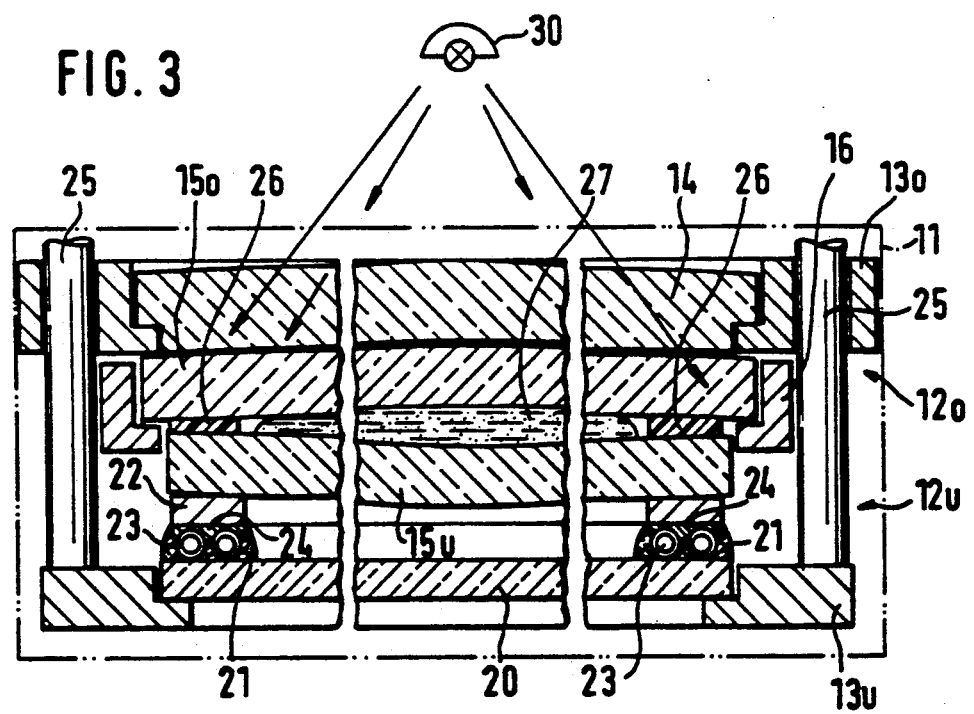
FIG. 3: schematic cross-section through a vacuum vessel which maintains the two plates of a liquid crystal cell in joined position.

A device for manufacturing a liquid crystal cell will first be described by means of FIGS. 1 to 3. The device is a vacuum vessel 11 and an upper holding device 12.o and a lower holding device 12.u. The vacuum vessel 11 is only represented by dashed lines so that the main components of the device are depicted as clearly as possible. The vacuum device can be designed in such manner that it is initially open. The holding devices retaining the liquid crystal plates are then operated. The vessel is closed, operations are performed and finally the entire vessel is ventilated. It can also be designed so that the actual working space is continuously evacuated and the upper and lower holding devices retaining one liquid plate each are introduced via air locks. However, it is of little import for the device parts and the main process operations how the device parts gain entrance into the actual work space.

The upper holding device 12.o has a square-shaped supporting ring in which the UV-permeable quartz glass plate is inserted. The upper liquid crystal plate 15.o is attached to the lower continuous surface of the supporting ring 13 and the quartz glass plate 14. The quartz glass plate 15.o is prevented from falling by two magnetic holders 16 which grip the left and right edges. Along each of the longitudinal sides, the upper liquid crystal plate 15.o has a notch 17 in which the centering pin 18 engages. Each notch 17 is located in an edge zone which is broken off on completion of the manufacturing process of the liquid crystal cell. The breakage lines 19 are depicted as dashed lines.

The lower holding device 12.u has a lower metal supporting ring 13.u and an IR-permeable glass plate 20. A square-shaped cooling ring 22 provided with cooling tubes 23 on its lower surface is bonded to the glass plate 20 by means of a retaining bond 21. The cooling ring 22 and the cooling tubes 23 are connected together by a solder joint 24. The dimensions of the cooling ring 22 are selected to permit it to support the edge zone of a lower liquid crystal plate placed on it. The lower liquid crystal plate 15.u also has notches 17 in an edge zone which is subsequently broken off. The notches 17 on the lower glass plate are positioned so that the centering pins 18 attached to the upper supporting ring 13.o can engage in the notches when the upper holding device 12.o is lowered down the guiding columns 25, which are attached to the lower supporting ring 13.u, until the upper liquid crystal plate 15.o is brought in the close vicinity of the lower liquid crystal plate 15.u. By means of the guiding columns 25, the notches 17 and the centering pins 18, the two liquid crystal plates 15.o and 15.u are positioned in relation with each other so that their electrode structures are aligned in the desired positions.

Figure 5:
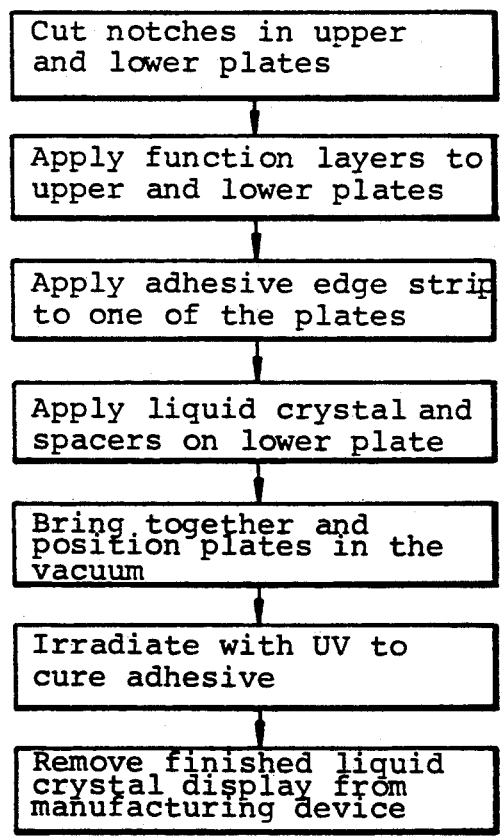
FIG. 5: Flowchart of the preferred manufacturing process.

With reference to the device described by means of FIGS. 1 to 3 and with reference to FIG. 5, a process for manufacturing a liquid crystal cell will now be described.

Firstly, the two plates 15.o and 15.u are placed closely one on top of the other and they are both then provided with notches 17. Function layers are then applied in the known manner, alternating between one structured electrode layer and one orientation layer and, if desired, another insulation layer between the electrode layer and the orientation layer. During the structuring procedure of the electrode layers, care must be taken to effect a positioning operation using the notches 17. This ensures that, when the finished plates 15.o and 15.u are joined together, the notches are again lined up, and the electrode structures are precisely aligned in the specified manner.

Then one of the two plates, in the case of the design example the upper plate 15.o, is provided with an adhesive edge strip 26 according to a conventional process, e.g. screen printing. The adhesive edge strip 26 is applied continuously, i.e. there is no filling hole. The adhesive may be any UV-curable adhesive, as used for the manufacture of liquid crystal cells. The liquid crystal plate 15.o obtained in this manner is then attached to the upper supporting ring 13.o by means of the magnetic holders 16 and it is aligned in relation to the centering pins 18 by the centering pins 18 engaging in the notches 17.

Two portions of liquid crystal are applied from a microliter pump onto the lower liquid crystal plate 15.u. A quantity of 50 μl of liquid crystal is required for a liquid crystal cell with an edge length of 10 cm and a thickness of 5 μm. The liquid crystal contains spacers which have a diameter of 5 μm. The lower liquid crystal plate 15.u is cooled at room temperature until the applied liquid crystal portions 27 do not run to the edge of the lower plate 15.u. Using positioning aids, the plate is placed onto the cooling ring 22 in such manner that the centering pins 18 meet the notches 17 as precisely as possible when the upper holding device 12.o is lowered onto the lower holding device 12.u. In order to enhance the guidance of the centering pins 18 in the notches 17, the centering pins 18 are provided with engaging tapers which are not depicted. The lower plate 15.u is placed in movable supports so that it can be centered. As soon as the lower liquid crystal plate 15.u is placed on the cooling ring 22, an IR lamp 28 arranged outside the vacuum vessel 11 is switched on and its irradiation cone is adjusted by a screen 29 so that it shines through the glass plate 20 and illuminates almost the entire lower liquid crystal plate 15.u, whereby there is still a small distance to the cooled edge zone. As the lower liquid crystal plate 15.u heats up, the portions of the liquid crystal 27 run, but only to an area close to the cooled edge zone. There the liquid crystal becomes so highly viscous that it spreads out only slowly or even solidifies.

As soon as the liquid crystal 27 has spread out over the lower liquid crystal plate 15.u close up to the cooled edge zone, the upper holding device 12.o is lowered until the adhesive edge strip 26 of the upper liquid crystal plate 15.o contacts with the cooled edge zone of the lower liquid crystal plate 15.u. The two plates are then pressed together in the edge zone at a specific pressure. A UV lamp 30 arranged above the vacuum vessel 11 is switched on. Its light penetrates the quartz glass plate 14 and impinges on the UV-curable adhesive of the adhesive edge strip 26, thus curing it. As soon as curing has progressed to such an extent that the adhesive properties of the wetted liquid crystal can no longer be adversely affected, heat is conducted to the cooling rings 22 instead of coolant in order to support the curing process of the adhesive by means of heat. The vacuum vessel 11 then starts to be evacuated. When the adhesive is sufficiently cured, the almost completed liquid crystal cell is removed from the ventilated vacuum vessel 11. The edge zones then remain to be broken off along the breakage lines 19.

It should be pointed out that the described preferred process can be modified in many ways. For example, the adhesive edge strips 26 can be applied to the bottom liquid crystal plate 15.u instead of the upper liquid crystal plate 15.o. The liquid crystal 27 need not necessarily be applied outside the vacuum vessel 11 on the lower liquid crystal plate 15.u, it can also be applied inside the vacuum vessel 11. This has the advantage that careful handling of the lower liquid crystal plate 15.u outside the vacuum vessel 11, which should also be preferably cooled, can be eliminated. Indeed, it is far simpler to mount the lower liquid crystal plate 15.u in the vacuum vessel. The edge is then cooled and the liquid crystal is then applied after the edge has sufficiently cooled.

The liquid crystal 27 need not necessarily contain spacers as in the preferred design example. Spacers can also be applied on the lower liquid crystal plate 15.u in any known manner before the liquid crystal is added by means of a microliter pump or any other metering device. In this process operation, it must be ensured, however, that the liquid crystal is only allowed to spread very slowly on the lower liquid crystal plate 15.u by selecting the working temperature accordingly. Otherwise the liquid crystal will flush away the previously applied spacers.

The described process can also be modified to such an extent that an adhesive edge strip 26 with a filling hole is used and the liquid crystal 27 is only applied in the known way after the two plates 15.o and 15.u are joined together. The process still has the advantage that a cell structure can be manufactured at much greater speed with an evacuated cell inner space than with conventional processes according to which evacuation takes place through the filling hole.

Figure 4A:
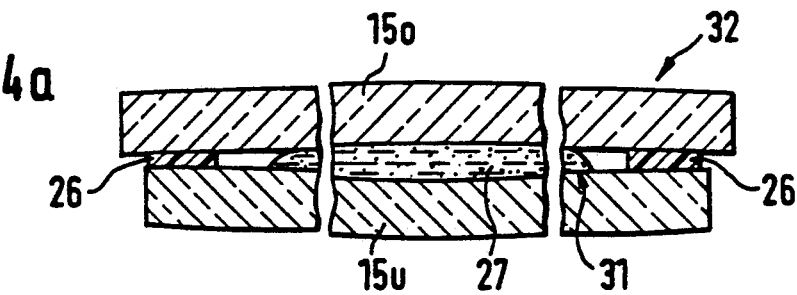
FIGS. 4A and 4B: Cross-sections through a liquid crystal cell before and after liquid crystal has been completely distributed in the internal space of the cell.
Figure 4B:
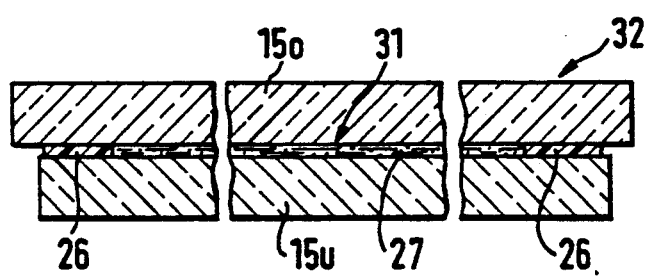

FIG. 4A shows that if that liquid crystal 27 has not spread over the entire inner space because of the cooled edge zone, the liquid crystal plates 15.o and 15.u become concave. Only when the liquid crystal 27 has spread over the entire inner space as depicted in FIG. 4B will the two plates 15.o and 15.u become parallel to each other. They then assume precisely the spacing given by the spacers 31 as depicted in FIG. 4B. It should be pointed out that the spacers are also preferably present in the adhesive of the adhesive edge strip 26 so that the correct spacing is obtained even when the liquid crystal 27 has not yet attained the edge zone. If no spacers are used in the adhesive, the correct plate spacing in the edge zone can be obtained by gauges inserted from outside.

At this point it should also be mentioned that the parts of the liquid crystal cell 32 are not depicted true to scale in any of the figures. The thicknesses of the plates and the liquid crystal layer are depicted as being identical, although the plates have a thickness of up to several millimeters, whereas the liquid crystal layer only has a thickness ranging from a few $\mu m$ to about 20 $\mu m$, depending on the type of liquid crystal cell. In its applied state, the width of the adhesive edge strip 26 is a few millimeters. When the plates 15.o and 15.u are pressed together, the adhesive edge strip 26 becomes wider.

It has transpired in experiments that particularly good adhesive properties can be attained if the applied liquid crystal 27 fails to wet the adhesive edge strip 26 at all. However, a slight wetting can still be accepted by the liquid crystal cells which are only exposed to mechanical loads which do not destroy the cell despite the somewhat reduced adhesive properties. Ideally, the applied quantity of liquid crystal 27 should be selected so that it is fully sufficient to form the liquid crystal layer of the specified length, width and height. However, deviations of a few percent are acceptable without any problem. If there is slight excessive liquid crystal, the thickness of the liquid crystal layer will be a few percent higher than the thickness specified by the spacers 31. This does not affect the function of the cell. If too little liquid crystal is applied, spaces not filled by liquid crystal 27 will remain in the vicinity of the adhesive edge strip 26. Although these bubbles will be noticeable, they will not disturb the edge zone since they will be masked anyway by the liquid crystal cell when a display is manufactured.

In the design example, the process involved cooling only the edge of the lower plate and applying liquid crystal in several portions. These procedures serve to distribute the liquid crystal as evenly as possible over the surface of the lower plate, with the exception of its edge zone, before the two plates are bonded together. This is advantageous with plates of irregular shapes or with square plates with a large side ratio, since there is the risk with such plates that, when the upper plate is pressed down, the pressed-out liquid crystal spreads to the nearest edge and overflows before the adhesive process can start. If local overflow is of no import, the entire quantity of liquid crystal can be applied in one drop.

It is also of great advantage to cool only that part of the lower plate on which the liquid crystal is applied in such portions that it does not run unduly when the upper plate is set down. With highly viscous crystals, e.g. smectic crystals, cooling can be omitted completely.

We claim:

1. A process for manufacturing a liquid crystal cell including an upper and a lower plate provided with function layers and connected to one another via an adhesive edge strip and including a liquid crystal layer, comprising the steps of:

providing one of the two plates with an adhesive edge strip;

applying a quantity of liquid crystal required to form the liquid crystal layer to the lower plate before the two plates are brought together;

placing the plates in a vacuum unit;

controlling the temperature of the lower plate while in the vacuum unit, so that a marginal area is maintained cooler then a central area surrounded by the marginal area, to such an extent that the applied liquid crystal spreads over the central area but becomes too viscous to flow into the cooler marginal area;

positioning and bringing the two plates together while in the vacuum unit and under a vacuum condition;

joining the two plates by means of the adhesive edge strip; and curing the adhesive.

2. A process as described in claim 1, wherein the applied liquid crystal contains spacers.

3. A process as described in claim 1, wherein the step of applying a quantity of liquid crystal is performed in air on a cooled plate prior to placing the plate in the vacuum unit.

4. A process as described in claim 1, wherein the adhesive edge strip comprises a UV-curable adhesive.

5. A process as described in claim 4, wherein the step of curing the adhesive comprises the step of irradiating the UV-curable adhesive with the UV light while in the vacuum unit.

6. A process for manufacturing a liquid crystal cell including an upper and a lower plate provided with function layers and connected to one another via an adhesive edge strip and including a liquid crystal layer, comprising the steps of:

providing one of the two plates with the adhesive edge strip;

applying a quantity of liquid crystal required to form the liquid crystal layer to the lower plate before the two plates are brought together;

placing the two plates in a vacuum unit;

cooling the lower plate, while in the vacuum unit, along a marginal area and warming the lower plate in a central area surrounded by the marginal area to such an extent that applied liquid crystal spreads over the warmed central area but not the cooled marginal area;

positioning and bringing together the two plates, while in the vacuum unit and under a vacuum condition;

joining the two plates by means of the adhesive edge strip; and curing the adhesive.

7. A process as described in claim 6 wherein the applied liquid crystal contains spacers.

8. A process as described in claim 6, wherein the step of applying a quantity of liquid crystal is performed in air on a cooled plate prior to placing the plate in the vacuum unit.

9. A process as described in claim 6 wherein the adhesive edge strip comprises a UV-curable adhesive.

10. A process as described in claim 9 wherein the step of curing the adhesive comprises the step of irradiating the UV-curable adhesive with UV light while in the vacuum unit.

* * * * *